Oct. 7, 1930. J. W. BATE 1,777,599
SCREW JACK
Filed Jan. 5, 1927 2 Sheets-Sheet 1

Inventor:
John W. Bate,
By Dyrenforth, Lee, Chritton & Wiles,
Attys.

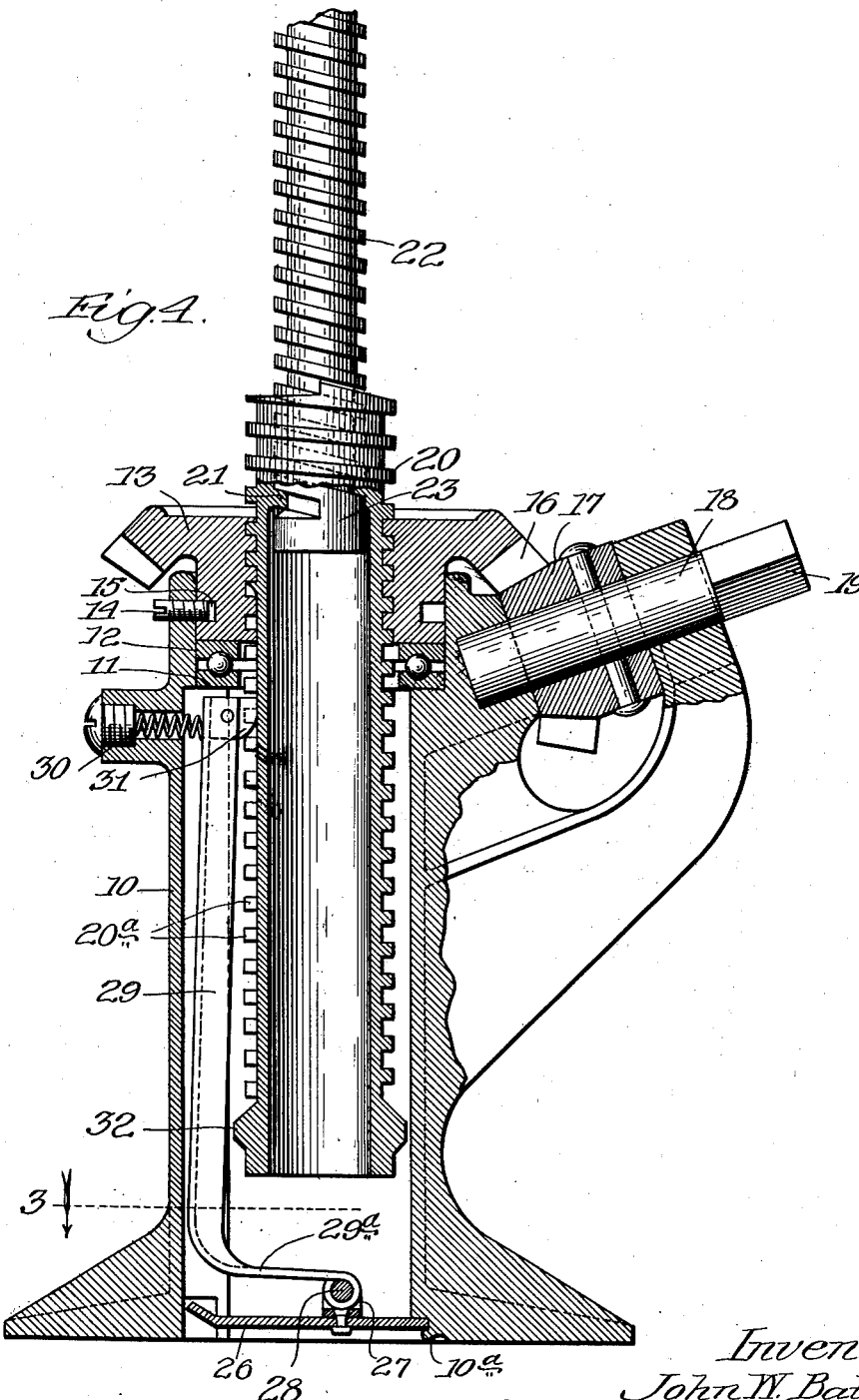

Patented Oct. 7, 1930

1,777,599

UNITED STATES PATENT OFFICE

JOHN W. BATE, OF RACINE, WISCONSIN, ASSIGNOR TO WALKER MANUFACTURING COMPANY, OF RACINE, WISCONSIN, A CORPORATION OF WISCONSIN

SCREW JACK

Application filed January 5, 1927. Serial No. 159,107.

This invention relates to screw jacks and particularly to those of the double lift type which are particularly adapted to be used on automobiles having balloon tires. Such automobiles require a jack having a very low initial height owing to the fact that when the tire is deflated the axle is very close to the ground. At the same time the large size of the tire requires that the lift of the jack shall be relatively very large.

The invention is fully described in the following specification and shown in the accompanying drawings, in which:

Fig. 4 is a view similar to Fig. 1, but showing the outer screw in a mid-position, the inner screw having been unscrewed by hand so as to stand in its position of maximum lift with respect to the inner screw.

Figure 1:
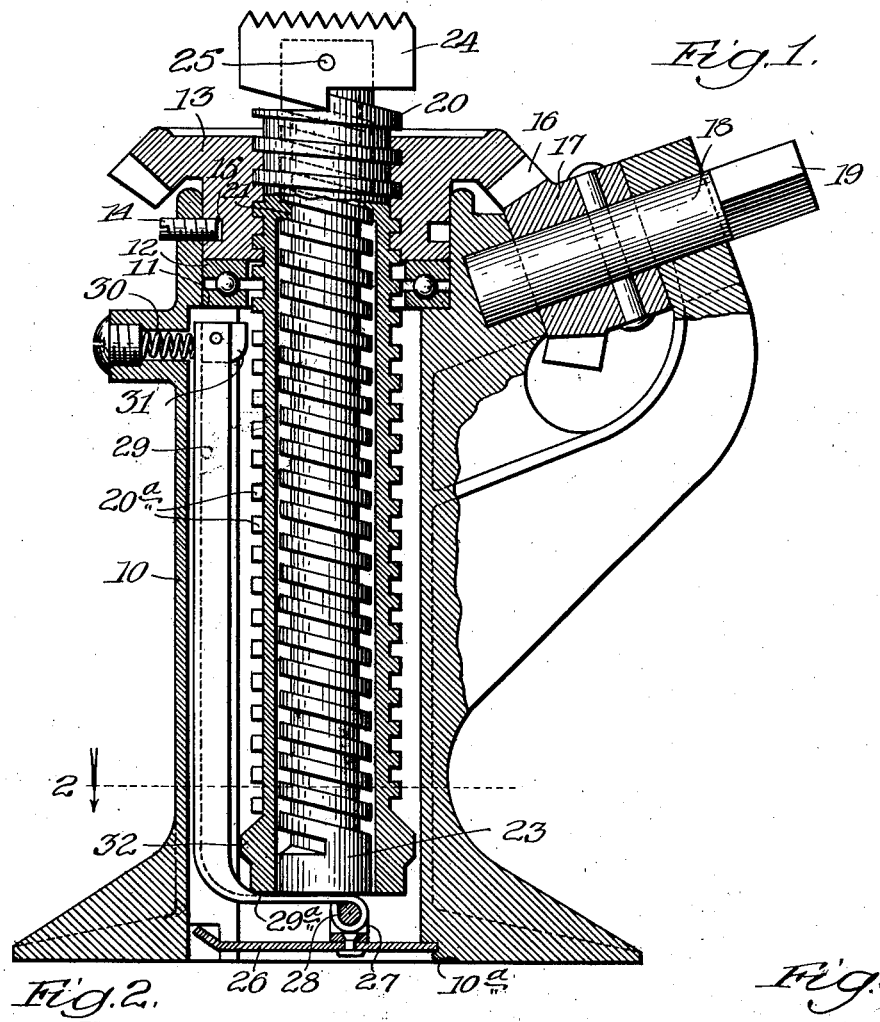
Figure 1 is a vertical sectional view through a jack embodying the invention, the jack being here shown in the fully lowered position.
Figure 2:
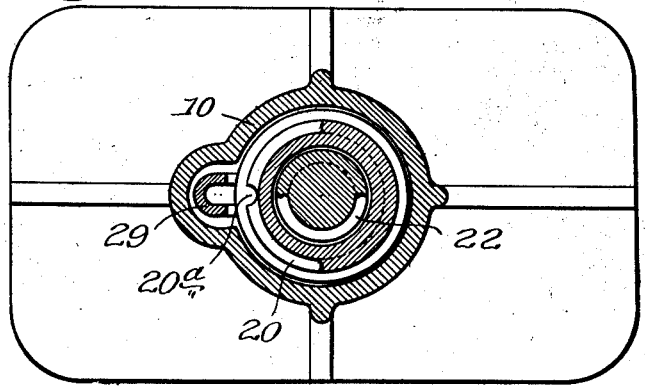
Fig. 2 is a transverse section on the line 2 of Fig. 1.
Figure 3:
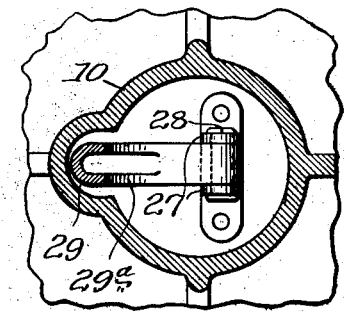
Fig. 3 is a partial transverse section on the line 3 of Fig. 4.

The embodiment illustrated comprises a hollow cast iron housing 10 having a ledge 11 upon which is supported a ball thrust bearing 12, the latter supporting in turn a nut 13. The nut is retained in the top of the housing by means of a screw 14 which engages an annular groove 15.

The nut 13 carries bevel gear teeth 16 which engage the teeth of a bevel pinion 17. The latter is pinned on a shaft 18 which is journaled in suitable bearings in the housing 10 and has an outer end 19 which is squared or otherwise adapted to receive a suitable crank for turning the same.

The nut 13 is provided with internal screw threads which are adapted to mesh with corresponding threads on the outer screw 20. This screw is hollow and is provided at its upper end with internal threads 21 which in turn are adapted to mesh with the threads of the inner screw 22. The latter threads stop at the lower end 23 so as to prevent this screw being withdrawn, while the upper end of the inner screw 22 is provided with a cap 24 which is secured thereon by means of a pin 25.

The lower end of the housing is closed by means of a plate 26 which is secured in place therein as by peening over the edge of the opening as at 10$^a$. A bracket 27 is secured within the plate 26 and carries a pin 28 on which is pivotally mounted the lower end of a lever 29, the upper end of the lever being pressed inwardly by means of a spring 30. The upper end of the lever 29 carries an insert 31 which is thus normally held in the longitudinal groove 20$^a$ in the outer screw. The lower end of the screw 20 is provided with an annular ledge 32, the purpose of which will later be explained.

In a mid-position of the outer screw 20, as shown in Fig. 4, the insert 31 is forced into the groove 20$^a$ by the spring 30, thereby preventing the screw 20 from rotating. Consequently as the nut 13 is turned, it raises or lowers the screw 20 depending on which way the screw is turned. As the screw 20 is fed down the lower end of the screw finally strikes the horizontal portion 29$^a$ of the lever 29. As the screw continues to descend it forces the lever 29 back against the action of the spring 30 until the insert 31 is drawn back as shown in Fig. 1 so that it clears the groove 20$^a$. Further movement of the nut 13 in this same direction then carries the outer screw 20 so that the two revolve together.

For the sake of a clear showing, the inner screw 22 is shown in the fully raised position. This would not ordinarily occur in normal operation of the jack however as the screw 22 is normally all the way down for any mid-position of the outer screw 20. It can, however, be raised to the position here shown by unscrewing the screw 22 by hand.

With the parts in the position as shown in Fig. 4, and the nut 13 being turned in a direction to raise the outer screw 20, this screw will be prevented from turning as has been heretofore explained by the insert 31 which will remain in the groove 20$^a$ until the beveled enlargement 32 moves up under the insert 31. When this occurs, the insert 31 will be pushed back and will thereby permit the screw 20 to turn with the nut 13. As the screw 20 then continues to turn, the upper portion acting as a nut will in turn force the inner screw 22 outwardly since it is held by the load resting upon the cap 24. This inner screw which, up to this time has been within the outer screw 20, is now fed upwardly until stopped by the unthreaded bottom 23.

The lowering operation is just the reverse of this. On turning the nut 13 in a direction to lower the jack, the nut and outer screw 20 rotate together until the inner screw 22 strikes the top of the outer screw 20 as shown in Fig. 1, and any further motion of the nut 13 in the same direction causes the screw 20 to be fed through this nut.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In a jack, a housing, inner and outer telescoping screw lifting members, a nut carried by said housing for lifting the outer screw, means for rotating said nut, and a spring-pressed element carried by said housing and adapted to engage one of said screws to prevent it from rotating, said outer screw acting to render said element inoperative at the lower end of the movement of said outer screw.

2. In a jack, a housing, inner and outer telescoping screw lifting members, a nut carried by said housing for lifting the outer screw, means for rotating said nut, and a spring-pressed element carried by said housing and adapted to engage a groove in said outer screw to prevent it from rotating, one of said screws acting to render said element inoperative at the lower end of the movement of said outer screw.

3. In a jack, a housing, inner and outer telescoping screw lifting members, a nut carried by said housing for lifting the outer screw, means for rotating said nut, and a spring-pressed element hingedly mounted in said housing and adapted to engage a groove in said outer screw, said screw being adapted to force said element away from said groove as the screw approaches the lower end of its movement.

4. In a jack, a housing, inner and outer telescoping screw lifting members, a nut carried by said housing for lifting the outer screw, means for rotating said nut, and a lever hingedly mounted in the lower portion of said housing and adapted to engage said outer screw to prevent it from turning, said lever having a portion lying in the path of said outer screw so that said outer screw engages it at the lower extremity of its movement to force said lever out of engagement with said outer screw.

5. In a jack, a housing, inner and outer telescoping screw lifting members, a nut carried by said housing for lifting the outer screw, means for rotating said nut, and a lever hingedly mounted in the lower portion of said housing and having a finger adapted to engage a longitudinal groove in said outer screw to prevent it from turning, said lever having a portion lying in the path of said outer screw so that said outer screw engages it at the lower extremity of its movement to force said lever out of engagement with said outer screw.

6. In a device of the character set forth, a housing, inner and outer telescoping screw members, a nut journalled in said housing and adapted to lift one of said screw, a movable element in said housing contacting with one of said screws and adapted to prevent rotation thereof during its length of vertical travel, and means carried by one of said screws adapted to force said movable element out of contact with said screw when said screw is at the limits of its travel.

In testimony whereof I have hereunto set my hand this 24th day of December, 1926.

JOHN W. BATE.